June 9, 1964   M. TROTT   3,136,903
INTEGRATED PROCESS TIMER FOR AUTOMATIC AND MANUAL
CONTROL OF DISHWASHERS AND THE LIKE
Original Filed April 25, 1955   3 Sheets-Sheet 1
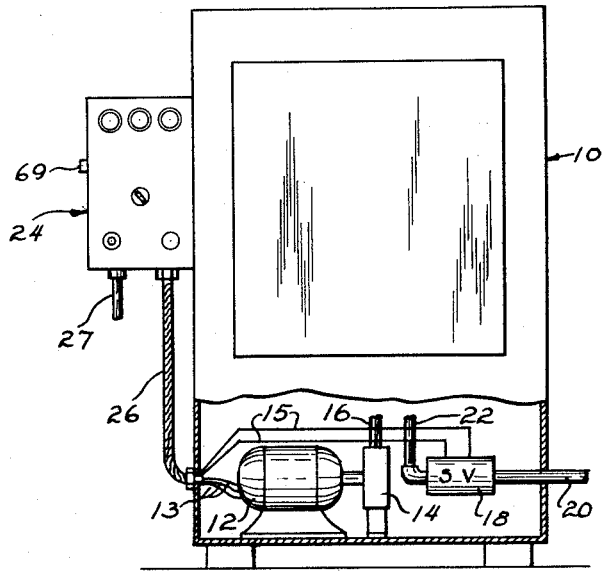
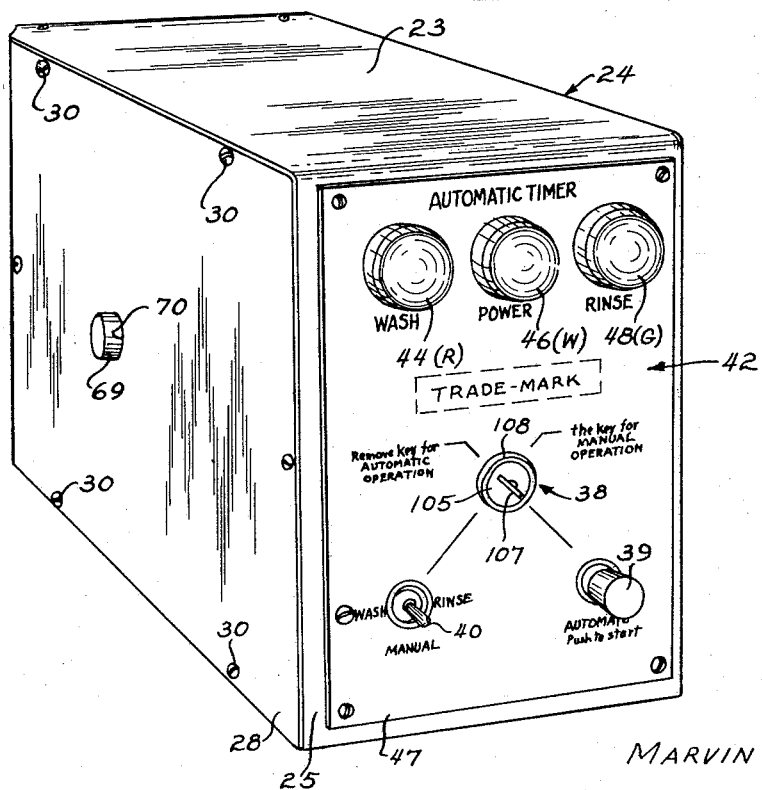
INVENTOR
MARVIN TROTT
BY Strauch, Nolan & Diggins
ATTORNEYS June 9, 1964
M. TROTT
3,136,903
INTEGRATED PROCESS TIMER FOR AUTOMATIC AND MANUAL
CONTROL OF DISHWASHERS AND THE LIKE
Original Filed April 25, 1955
3 Sheets-Sheet 2
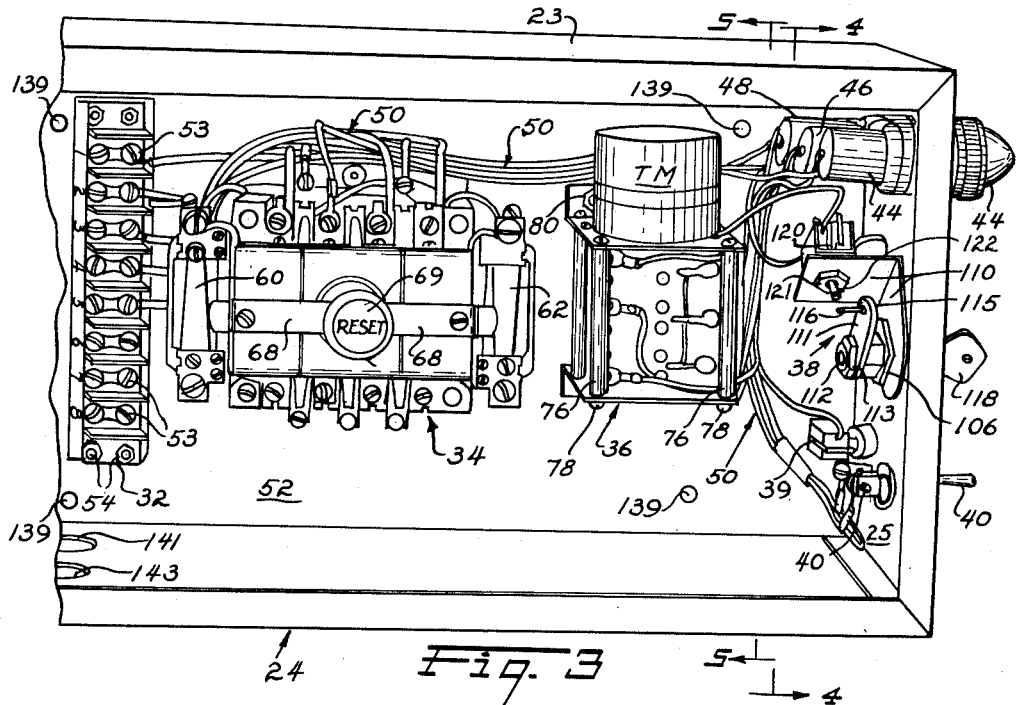
Fig. 3
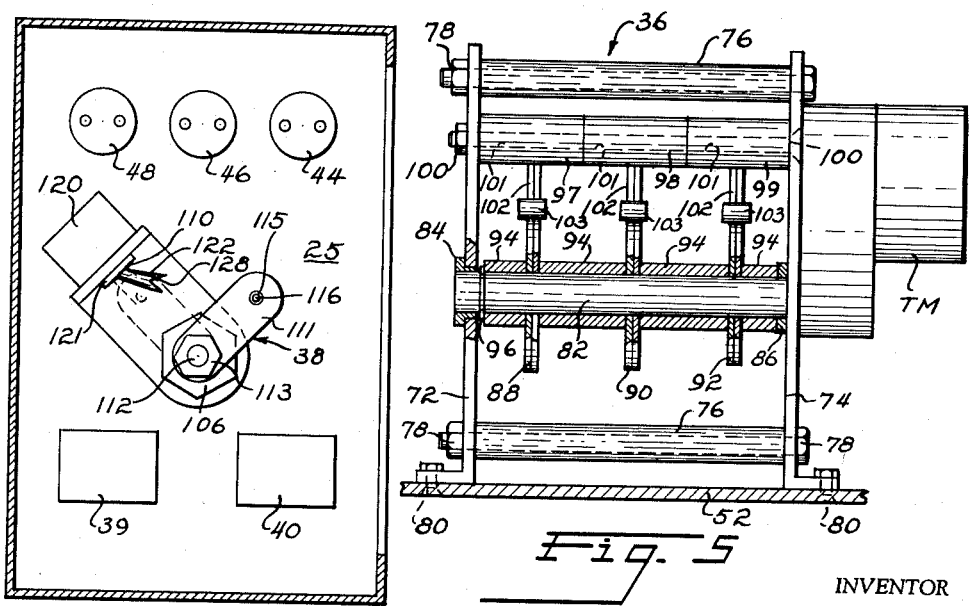
Fig. 4
Fig. 5
INVENTOR
MARVIN TROTT
BY Strauch, Nolan & Diggins
ATTORNEYS June 9, 1964　　　　　M. TROTT　　　　　3,136,903
INTEGRATED PROCESS TIMER FOR AUTOMATIC AND MANUAL
CONTROL OF DISHWASHERS AND THE LIKE
Original Filed April 25, 1955　　　　　3 Sheets-Sheet 3

INVENTOR
MARVIN TROTT

BY Strauch, Nolan & Diggins
ATTORNEYS

United States Patent Office 3,136,903
Patented June 9, 1964

3,136,903
INTEGRATED PROCESS TIMER FOR AUTOMATIC AND MANUAL CONTROL OF DISHWASHERS AND THE LIKE
Marvin Trott, 412 Smith St., Rochester, N.Y.
Continuation of abandoned application Ser. No. 809,573, Apr. 28, 1959, which is a continuation of application Ser. No. 503,647, Apr. 25, 1955. This application Apr. 19, 1960, Ser. No. 23,336
7 Claims. (Cl. 307—141)

The present invention relates to a process control device and more particularly to an integrated process timer for commercial dishwashers and the like.

Many of the commercial dishwashers on the market for use in restaurants, hospitals and the like do not have built-in timer controls or motor starters for thermal protection of the dishwasher motor. It has heretofore been the practice with such dishwashers to provide them with a separately mounted timer motor and metal-encased motor starter, which are suitably wired to each other and units of the washer. Such installations require at least 12 wires in 5 cables as follows: (a) 2 between the timer motor and motor starter; (b) 2 between the timer motor and the washer solenoid valve or booster pump controlling rinse water; (c) 3 between the motor starter and the washer motor; (d) 3 between line and the motor starter; and (e) 2 between line and timer motor. A single light is usually provided to indicate whether power supply is on or off; the light is also individually mounted and wired if one is used.

That prior control arrangement has a number of disadvantages compared to the integrated control unit of this invention. It entails extra mounting for two units (or 3 if a lamp is used). It requires extra cables and electrical connections. There is a substantial possibility of errors in wiring so that installation requires relatively skilled and more expensive labor. Installation is time consuming and costly, disproportionately increasing the overall cost of the timer control. There is no control panel for easy convenient operation.

The present invention provides an integrated, pre-assembled process timer unit which eliminates the foregoing disadvantages of the prior art, can be made and installed at far lower cost, has a finished neat appearance, and accomplishes many more functions. The control unit of the present invention can be quickly mounted with only four bolts. It requires only 8 wire connections instead of 12, with only 2 cables instead of five, as follows: (a) 3 wires in a cable from line to the unit and (b) 5 wires in a cable from the unit to the motor and solenoid valve of the washer. The unit practically eliminates installation errors, and an ordinary mechanic without any knowledge of circuitry can be trained in about 2 hours to quickly install it, thereby substantially reducing labor costs. The unit also eliminates the metal casing required for the separate motor starter of the prior systems, which cost about $2.00 each. Further, the integrated control unit of this invention is convenient and advantageous to dishwasher manufacturers because it reduces their manufacturing problems and indirect costs like inventory and overhead.

One commercial dishwasher manufacturer presently using this invention was formerly expending $125 for a complete control set-up according to the above-described prior art system. It is now installing the integrated control unit of this invention for about $81.00, and at the same time is getting new improved functions which increase the salability of its dishwashers.

In addition to the foregoing economic advantages and convenience in production and installation, the integrated control unit of this invention provides several new improved functions in dishwasher control that meet problems not met by control systems heretofore available, and increase the salability.

It is desirable in a commercial dishwasher to have a timer control system that can alternatively be operated manually as well as automatically so that a wash or rinse cycle can be lengthened or shortened when necessary, or for use in an emergency if the timer motor fails. There are some prior process controls and dishwashers in which the timer can be advanced manually, but heretofore there has been no control installation available to my knowledge providing the washer with true independent alternative manual and automatic timer controls for wash and rinse water, as in the present invention.

When a dishwasher for a restaurant or institution is provided with a manual control, this entails at least one important problem that has not heretofore been satisfactorily met. The individuals who operate such dishwashers are often unreliable. With controls heretofore available they can and often do accelerate the timer control to cut the wash and/or rinse cycles so that they have more time to loaf or smoke, and dishes are poorly washed and unsanitary. Further, some states like New York have codes that require a minimum wash cycle in restaurants, institutions, etc., and acceleration of the cycle by the operator is a violation of the law. To obviate the aforementioned shortcomings of prior systems, this invention contemplates an integrated unit having a key-locked switching system whereby the timer and dishwasher can be operated manually only when the key is in the lock and is held in a particular position. This gives the restaurant owner or like supervisor virtually fool-proof control against unauthorized wash cycle acceleration but still permits easy convenient manual operation, as will presently appear.

It is a principal object of the present invention to provide an integrated process timer device for control of standard commercial dishwashers and the like.

It is also a primary object of the invention to provide an improved dishwasher or like combination having a centralized automatic control device.

It is another object of the present invention to provide a process timer that is alternatively operable automatically or manually by simple "push button" controls.

It is still another object of the present invention to provide a key-locked automatic-semiautomatic timer control system in which the semi-automatic controls may be manually operated only with the key in, whereby the automatic cycle cannot be tampered with by unauthorized persons.

It is still another object of the present invention to provide an integrated control unit for commercial dishwashers having a simplified central control panel, so that anyone can easily operate it. It is a related object to provide such a unit with a control panel having 3 indicator lights in the control circuits which indicate power on and the different phases of the washer cycle, such as wash and rinse.

It is another object of the present invention to provide a process control unit which eliminates human errors in operation, provides properly timed cycles and assures that requirements of sanitary codes are met.

It is still a further object to provide an economical low cost integrated process timer control unit that can be easily and quickly installed by a relatively unskilled workman with a minimum of wiring, cables and connections, and with a single mounting.

The above and other advantages and objects of the present invention will be apparent from the following description thereof in connection with the drawings, in which:

FIGURE 1 is a partly broken away elevation view of a commercial dishwasher in combination with a process control unit according to the present invention;

FIGURE 2 is a perspective view of an integrated control device according to this invention;

FIGURE 3 is a side elevation view of the control device of FIGURE 2 with the side panel removed to show its principal components;

FIGURE 4 is a sectional view along line 4—4 in FIGURE 3;

FIGURE 5 is a sectional view along line 5—5 in FIGURE 3;

Figure 6:
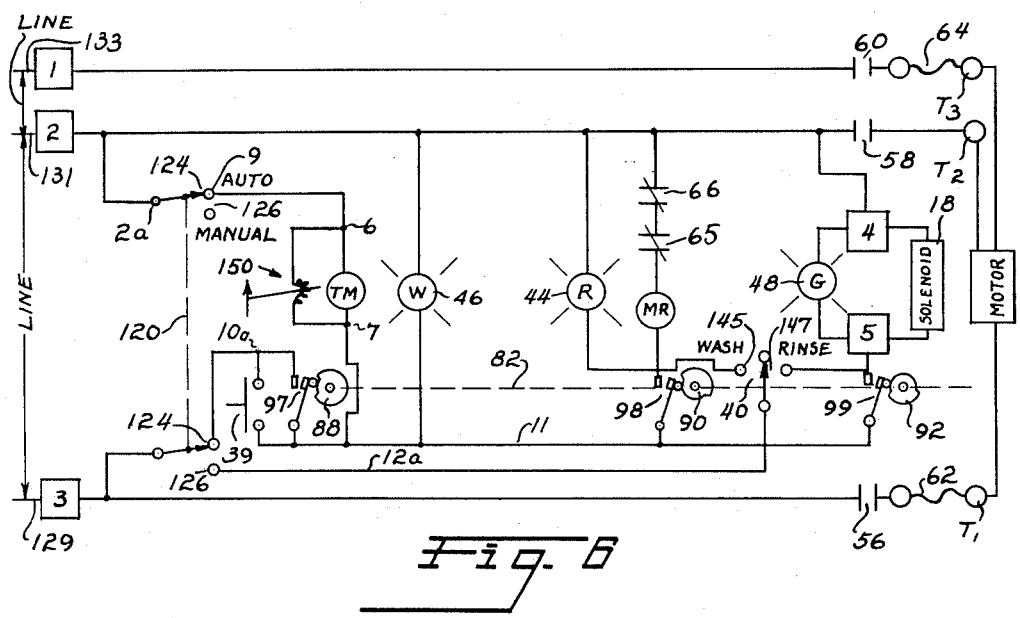
FIGURE 6 is a wiring diagram of the control device of FIGURES 2-5.

Referring to FIGURE 1, there is shown a commercial dishwasher generally indicated at 10 having a motor 12 driving a circulating pump 14 to circulate detergent washing water through pipe 16 to the working section of the washer 10 (not shown), and a solenoid operated valve 18 for controlling flow of fresh hot rinse water under line pressure from inlet pipe 20 to the dishwasher working section through pipe 22. Instead of a solenoid valve 18, the washer 10 may have an electrically controlled booster pump to supply rinse water under pressure. An integrated control unit 24 according to the present invention is mounted on the side of the dishwasher adjacent its front, and is electrically connected to the washer motor 12 and solenoid valve 18 by a plurality of wires 13 and 15 enclosed in a single cable 26. Power is supplied to the washer 10 through control unit 24 by wiring 27 connected to line and to unit 24.

Referring to FIGURES 2 to 5 the integrated control device 24 of this invention comprises a five-sided sheet metal enclosure 23 with a removable sixth side panel 28 secured to it by a plurality of machine screws 30 to permit easy access to its control components for installation, adjustment or conversion of cycle sequences. Referring particularly to FIGURE 3, control unit 24 comprises a terminal contact strip 32, a commercial motor starter 34, a sequence timer control sub-unit generally indicated at 36, a key-lock switch control generally indicated at 38, a pushbutton switch 39 for automatic operation, a toggle control switch 40 for manual operation, and a control panel 42 including a series of differently colored indicator lights 44, 46 and 48 and a face plate 47 with operating instructions on it. Suitable wiring generally indicated by the numeral 50 is provided to electrically connect the various components according to the wiring diagrams in FIGURES 6 and 7 as hereinafter described.

The contact strip 32 is of a type commercially available and in this instance comprises 8 pairs of contacts 53 which are preferably numbered as in FIGURE 3 to facilitate installation of unit 24 on washer 10 by a relatively unskilled worker. The strip 32 is connected to the mounting side face 52 of unit 24 by a plurality of screws 54 or other suitable means. Motor starter 38 is a standard commercial type as exemplified by the starter manufactured by the Arrow-Hart and Hageman Company of Hartford, Connecticut under the designation "Type RA, size 0." Referring to FIGURES 6 and 7, motor starter 34 comprises a motor operating relay coil MR and three normally open contacts 56, 58 and 60 which are closed when coil MR is energized through the control circuits of unit 24. Starter 34 further comprises a pair of overload heaters 62 and 64 each forming part of a thermostat switch which opens normally closed contacts 65 and 66, respectively, to stop power to the washer motor 12 to protect it against overload. A reset bar 68 and button 69 are provided in starter 34 in the latter event. A circular cutout 70 is provided in coverplate 28 so that the reset button extends through it and is readily accessible without opening of unit 24.

Referring to FIGURES 3 and 5, the sequence timer sub-unit 36 comprises a pair of L-brackets 72 and 74 interconnected by four hollow cylindrical mounting posts 76 of equal length and bolts 78 extending through the centers of the posts and corresponding holes in the brackets 72 and 74. L-brackets 72 and 74 are mounted on side wall 52 by four machine screws 80 or like means, and a timer TM is secured to bracket 74 by screws or like means not shown. Timer TM is any suitable commercially available type such as the 5800 series cam timer made by the Hayden Manufacturing Company of Torrington, Connecticut. The timer output shaft drives, at a given predetermined speed, a rotating cam shaft 82 which is supported in any suitable manner, as in a pair of bearing sleeves 84 and 86 in L-brackets 72 and 74. A plurality of cams 88, 90 and 92 are non-rotatably mounted on the cam shaft 82 by suitable means like keys or a spline, or by use of a non-circular central mounting aperture in the cams 88, 90 and 92. Preferably, as indicated in FIGURE 5, each cam comprises 2 stamped cam plates of like outline which are angularly spaced with respect to each other on the cam shaft to produce the desired cam control surface at minimum cost. Cams 88, 90 and 92 are properly spaced along the camshaft 82 by a plurality of cylindrical spacer sleeves 94, and cams and sleeves are held against displacement on the cam shaft 82 by any suitable means, such as retaining ring 96. Each of the cams operates one of three snap switches 97, 98 and 99 which are mounted side by side between L-brackets 72 and 74 by a pair of screws 100 extending through aligned holes 101 in the body of each switch. The switches in the disclosed embodiment are single pole single throw, and have a spring cantilever arm 102 provided at its end with a roller 103 that is pressed against the periphery of the cam 88, 90 or 92 with which it is associated and acts as a spring loaded cam follower. A suitable switch for this purpose is the model MXF-1 roller leaf actuator precision switch sold by the Unimax Switch Company of New York, New York, shown on page 13 of that company's catalog No. 53-11. Referring to FIGURE 6, switches 97, 98 and 99 are normally open, when the roller follower 103 rides the smaller radius portion of the cam periphery and closed when it rides the larger radius section.

Referring to FIGURES 2, 3 and 4, the three conventional indicator lights 44, 46 and 48 are mounted across the top of the front end wall 25 of unit 24 by suitable means and are wired into the control circuits of unit 24 as indicated in FIGURE 6. Light 46 is white and indicates power is on; light 44 is red and indicates when the washer motor 12 and pump 14 are operating washer 10 in the wash cycle; and light 48 is green to indicate when the solenoid valve 18 (or booster pump) is on so that washer 10 is being operated in the rinse cycle.

A conventional commercially available single pole single throw push button switch 39 is suitably mounted in end wall 25 and is connected into the control circuit of unit 24 as in FIGURE 6 for starting the unit 24 and washer 10 in automatic operation. A commercial single pole double throw toggle switch 40 is suitably mounted in end wall 25 and is connected into the manual operation circuits of unit 24 as in FIGURE 6. Toggle switch 40 is a momentary-off-on type so that it will remain in the wash cycle contact position or the off position, but is spring-biased so that it must be held in the rinse cycle contact position.

Referring particularly to FIGURES 3 and 4, the key-lock switch control 38 is there shown in detail. This comprises a lock 105 of a type that is key operated between two positions, preferably 90° apart; is spring biased to one of the two positions (hereinafter called "automatic position"); and does not permit the key to be withdrawn when the lock is in the other position (hereinafter called "manual position"). Such a lock is commercially available at low cost from the Chicago Lock Company of Chicago, Illinois. The lock 105 is mounted in a circular aperture in end wall 25, with wall 25 interposed between a retaining flange 108 at the front of the lock and a retaining nut 106 on the threaded outer barrel of the lock inside wall 25. The lock is arranged so that the key slot 107 is angularly disposed 45° from the vertical of unit 24 in both automatic and manual position. An L-bracket 110 is non-rotatably mounted on the outer lock barrel between retaining nut 106 and the inside of wall 25 at a 45° angle to the vertical as shown in FIGURE 4.

A small rectangular plate 111 is non-rotatably mounted on the threaded end of the rotating lock plug 112 by a retaining nut 113 with its longitudinal axis aligned with the key slot 107. A machine screw 115, which is turned down most of its length at 116, is mounted adjacent the free end of arm 111. By this construction, arm 111 and pin 116 swing through a 90° arc from normal position shown in full line in FIGURE 4, when the lock 105 is in automatic position, to the position shown in dotted line when the key 118 is in and the lock 105 is held in manual position. On the horizontally extending leg of L-bracket 110, there is mounted a commercially available double pole double throw toggle switch 120 which is secured to the bracket by a retaining nut 121. The toggle lever 122 of the switch 120 is biased to the full line position in FIGURE 4, so that one set of fixed switch contacts indicated in FIGURE 6 at 124 is normally closed, and the other set of fixed contacts indicated at 126 is normally open. A small V-notch 128 is provided in the end of the toggle lever 122. When key 118 is turned clockwise in FIGURE 2 to manual position, the arm 111 rotates to the dotted line position in FIGURE 4 and pin 116 engages notch 128 and moves toggle lever 122 to the dotted line position in FIGURE 4, thereby transposing the moving contact member of switch 120 from normally closed contacts 124 to normally open contacts 126. The key cannot be removed in manual position indicating to the owner that manual operation is being used. The key can be removed for automatic operation.

Figure 7:
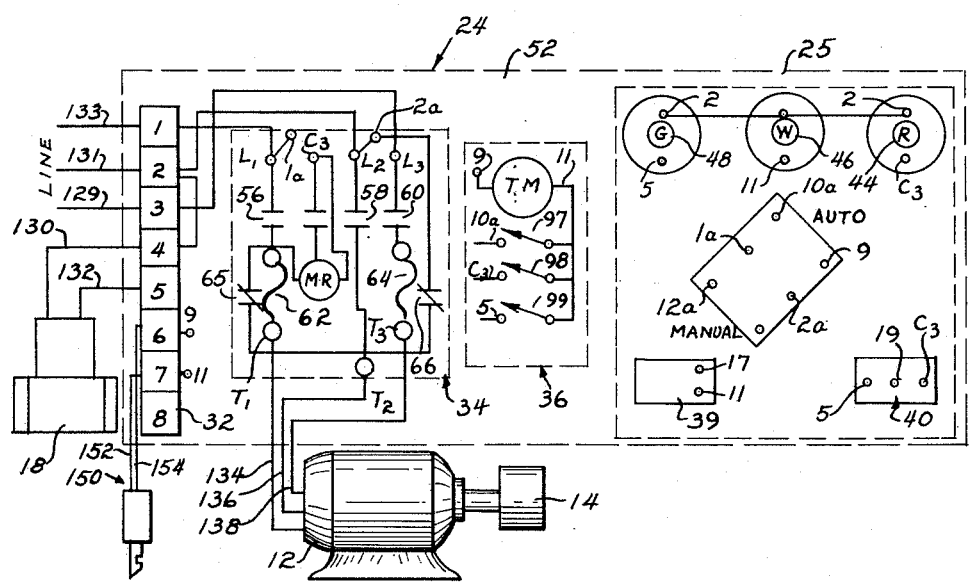
FIGURE 7 is a wiring diagram and schematic showing of the principal components of the present control device in a typical dishwasher installation.

The wiring of the various components of control device 24 will be apparent from FIGURES 6 and 7 and the description of operation below. All wiring in FIGURES 6 and 7 is connected during the manufacturing assembly of unit 24 excepting for wire 129, 131 and 133 which are connected to line for power input; wires 130 and 132 which are connected to the solenoid valve 18 to operate it; and wires 134, 136 and 138 which are connected to washer motor 12 to operate it. FIGURE 7 shows the true circuit of the integrated preassembled control device 24, and the wiring for a typical washer installation. FIGURE 6 is a schematic showing of the principal components of unit 24 with wiring only partially shown for clarity in the drawings. In the actual preassembled unit, the various points in this figure identified with like numbers are electrically connected by suitable wiring.

The above-described process control unit 24 lends itself to use of a simplified low-cost attractive central control panel 47 suitably imprinted with operating instructions as shown in FIGURE 2. The trademark of the dishwasher manufacturer may be and usually is imprinted on this panel also. This control panel disproportionately increases the salability of control unit 24 and a washer using it compared to prior units.

*Installation*

To install the preassembled process control unit 24, it is first mounted on the side of washer 10 by means of four bolts extending through holes 139 in its side wall 52. The three wires 129, 131 and 133 to lines are passed through opening 141 and respectively connected to contacts numbered 1, 2 and 3 on contact strip 32. The two wires 130 and 132 are respectively connected to contacts 4 and 5 on the strip 32 and the solenoid valve 18. The three wires 134, 136 and 138 are connected to the motor 12 and three contacts on the motor starter which are marked $T_1$, $T_2$ and $T_3$. Wires 130, 132, 134, 136 and 138 are in a single cable connected to the unit 24 at opening 143. The side cover plate is secured by screws 30 and this completes the installation of unit 24 on the washer 10, forming a new improved combination.

It is obvious from the above that installation of unit 24 is accomplished with a minimum of time, effort and expense.

*Operation*

Assuming that the dishwasher 10 is to have a one minute automatic cycle which is common, operation of the control unit 24 and washer 10 is as follows:

For automatic operation, key 118 is out, and lock 105 is in the automatic position shown in FIGURE 2 so that contacts 124 of toggle switch 120 are closed. To put the washer 10 through the wash cycle, the operator merely depresses push button switch 39 for about 1 second, and from then on the control unit 24 completes the wash cycle and the operator is free to prepare another batch of dishes for the next washing. Referring particularly to FIGURE 6, when switch 39 is depressed, this closes its normally open contacts thereby supplying current across timing motor TM and white power indicator light 46 from lines 129 and 131. Rotation of timer motor TM and cam shaft 82 causes cam 88 to close switch 97 in about ½ second in parallel with closed push button switch 39 completing a holding circuit that maintains power supply across timer motor TM, which continues to run, and white power indicator light 46, which remains on. Cam 88 has a periphery that will keep switch 97 and the power supply holding circuit closed until the end of the complete automatic washer cycle. Cam 90 is designed and positioned so that rotation of shaft 82 causes it to close switch 98 about the same time as switch 97 was closed by cam 88, and hold switch 98 closed for about 42 seconds. This supplies current through the motor starter relay MR causing contacts 56, 58 and 60 of starter 34 to close thereby operating the washer motor 12 and circulating pump 14, so that the pump circulates and recirculates wash water and detergent to the wash chamber of washer 10 for 42 seconds. The closing of switch 98 also supplies power to light the red indicator lamp 44, which then shows at a glance that the wash cycle is on. At the end of the 42 second period, the cam follower for switch 98 drops from the larger to the smaller radius of cam 90 for the rest of the automatic cycle, thereby opening switch 98 which in turn turns off wash indicator lamp 44 and shuts off washer motor 12 to stop pump 14 and circulation of detergent wash water. The periphery of cam 92 is designed so that 6 seconds will elapse after switch 98 opens before cam 92 is rotated to the position where it closes switch 99. This permits the dirty detergent wash water to drain and drip from the dishes, thereby saving on the amount of hot rinse water required. After 6 seconds, cam 92 closes switch 99 for 10 seconds, supplying power to contacts 4 and 5 and green indicator light 48. This operates the solenoid of valve 18 for 10 seconds so that hot water is sprayed on the dishes in washer 10 under line pressure to rinse them, while green light 48 indicates to the operator that the rinse cycle is on. Of course, a suitable booster pump can be substituted for valve 18 across contacts 4 and 5 if it is desired to supply rinse water under greater than line pressure. After 10 seconds cam 92 permits switch 99 to open, whereby valve 18 is closed cutting off rinse water, and the green indicator light 48 goes out. About one second later, depending on how the cams are set, cam 88 allows switch 97 to open so that timer motor TM and power light 46 go off. This concludes the automatic cycle of control unit 24 and washer 10 and the washer is then ready for the next washing, which on automatic cycle is repeated as above.

For manual operation, key 118 is inserted and the lock 107 turned clockwise in FIGURE 2 to the manual operation position. With the key so located, pin 116 operates toggle lever 122 of switch 120 to open its normally closed contacts 124 and close its normally open contacts 126, thereby cutting off power to the timer motor TM and other automatic cycle circuitry and supplying power to the manual operation circuitry. Under manual operation, the motor starter 34 and motor 12, indicator lights 44, 46 and 48, and solenoid valve 18 function in same way as on automatic cycle. To wash, the operator snaps the toggle of switch 40 to the left in FIGURE 2 closing contact 145 thereby operating motor relay MR, red indicator lamp 44, washer motor 12 and pump 14 to circulate wash water. To rinse, the operator holds the toggle of switch 40 to the right closing contact 147, thereby operating green indicator light 48 and solenoid valve 18 to supply rinse water. At all times during manual operation the key 118 must be in manual position, and it cannot be removed until the lock 107 is again in automatic position. This makes control unit 24 and washer 10 substantially fool-proof against unauthorized acceleration of the wash cycle unless the supervisor provides the key 118 for that purpose. The toggle switch 40 snaps from neutral into wash position, but must be held in rinse position thereby preventing undue waste of fresh hot rinse water by an overlong rinse because of neglect of the operator or other reasons.

*Modifications*

While the process control device 24 of the present invention has been described with reference to a dishwasher for convenience of illustration, it has other analogous uses. E.g., it may be used in a laboratory on a bottle or test tube washer. In the latter event one or more cams and switches can be added to the timer subunit 36 for additional functions like a distilled water rinse. If desired another lamp may be employed in the circuit to visually indicate the added operation. The control device 24 can also be used as a process timer control to govern sequence and timing of a plurality of mixing valves in a chemical process where analogous problems are involved to those above-discussed, and in other analogous problems are involved to those above-discussed, and in other analogous applications.

The total automatic cycle can be set for different time periods through use of timing motors with different r.p.m., and the times for each portion of a given automatic cycle can be readily varied by change of the cam peripheries and relative angular displacements.

To illustrate how the process control unit 24 can be readily adapted to additional control functions besides the principal ones above-described, there is schematically shown in FIGURES 6 and 7 a control arrangement for an auxiliary solenoid operated door latch generally indicated at 150. The operating solenoid of latch 150 is connected to contacts 6 and 7 of strip 32. Contacts 6 and 7 are in turn connected to points 11 and 9 in FIGURES 6 and 7. In such case, closing of push button switch 39 and/or cam operated switch 97 will operate the latch solenoid to hold the door of the washer closed as long as either of switches 39 or 97 is closed. In the disclosed embodiment, latch 150 is thus retained closed throughout the entire automatic cycle.

Cycle times can also be converted quickly and easily in the present invention by simply replacing the timer subunit 36 with a like subunit having a different timer and cam arrangement.

From the foregoing it will be apparent that the present invention provides a novel improved compact integrated process timer control device for standard commercial devices like dishwashers; that the new control can be made and installed at much lower cost than comparable controls heretofore available; that it provides a novel system of true alternative automatic and semi-automatic manual control cycles, with simple push button operation in either case; that it provides a key-locked electrical control system that prevents unauthorized manual operation in lieu of the automatic cycle; that it provides a unit having a simplified central control panel so that anyone can operate it, with indicator means thereon that show at a glance the nature of machine operation at any time; and that it provides a device which virtually eliminates errors in operation and installation and assures meeting sanitary codes. It is further apparent that the present invention provides new improved dishwashers and like combinations which, in embodying the control device of this invention, have many new and useful improved functional results as a combination that were not achieved by comparable combinations available heretofore.

This application is a continuation of my application Serial No. 809,573 filed April 28, 1959, for Process Timer Control, said application Serial No. 809,573 in turn being a continuation of my application Serial No. 503,647 filed April 25, 1955, for Process Timer Control, both applications now abandoned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An integrated process timer control device for use with a processing machine which includes at least one motor driven processing means and at least one other electrically controlled processing means, said control device including a housing for the elements thereof, and further comprising: power input contacts which are adapted to be electrically connected to a power source; output contacts which are adapted to be electrically connected to an electrically controlled processing means on a machine; a motor starter and means electrically connecting said motor starter to said power input contacts, said motor starter being adapted to be electrically connected to a motor driven processing means on a machine; a timer and related switch means operatively connected with said power input contacts for providing automatic cyclical control of sequential power supply to said output contacts and to said motor starter, respectively; manually operable means in parallel with said timer and related switch means for manual control of power supply from said power input contact to said motor starter and said output contacts, respectively, independently of the automatic cyclical control by said timer and switch means; and a key operated lock and switch means for connecting said manually operable means with said power input contacts while disconnecting said timer and switch means from said power input contacts, with the key for operating said last-mentioned means being non-withdrawable during manual operation.

2. An integrated process timer control device as defined in claim 1, wherein said last-mentioned lock and switch means are normally disposed so that said timer and switch means are normally connected with said power input contacts.

3. An integrated process timer control device as defined in claim 1, wherein said timer and switch means comprise a complete sub-unit removably mounted in said housing and replaceable with a like timer and switch means sub-unit for providing a different time control cycle without modification or rearrangement of other parts of the control device.

4. An integrated process timer control device for use with a washing machine which includes at least one electric motor driven operating means for performing at least one wash cycle and at least one other electrically controlled operating means for performing at least one other cycle, said control device including a housing with means adapting it to be mounted on the washing machine as a control unit therefor, and said control device further comprising: contacts in said housing providing a common power input, and adapted to be connected to a power source for the washing machine and said control device; output contacts in said housing which are adapted to be electrically connected to said other electrically controlled operating means on the washing machine; a motor starter in said housing and means electrically connecting said motor starter to said power input contacts, said motor starter being adapted to be electrically connected to the operating motor on the washing machine; a timer and related switch means in said housing for providing automatic cyclical control and sequential power supply to said output contacts and to said motor starter, respectively, so that the timer control device will effect a sequential control of the motor driven operating means and the other operating means on the washing machine; manually operable control means in parallel with said timer and switch means for manual control of the power supply from said power input contacts to said motor starter and said output contacts independently of the automatic cyclical control by said timer and switch means; and a key-operated lock and switch means for connecting said manually operable means with said power input contacts while disconnecting said timer and switch means from said power input contacts, so that said manually operable means can be operated only in conjunction with said key-operated lock and switch means.

5. An integrated process timer control device for a washing machine as defined in claim 4, wherein said lock and switch means are normally disposed so that said timer and switch means are normally connected with said power input contacts.

6. An integrated process timer control device as defined in claim 5, wherein the key for said lock and switch means cannot be withdrawn from the lock when said lock and switch means are in position enabling manual operation of said manually operable means.

7. An integrated process timer control device for a washing machine as defined in claim 4, further comprising indicating means for showing when the process timer control device is operating the washing machine in a wash cycle or other cycle.

References Cited in the file of this patent
UNITED STATES PATENTS

| | | |
|---|---|---|
| 1,010,753 | Halbleib | Dec. 5, 1911 |
| 1,749,672 | Mitchell | Mar. 4, 1930 |
| 2,779,937 | Pellerin et al. | Jan. 29, 1957 |
| 2,947,311 | Fox et al. | Aug. 2, 1960 |

UNITED STATES PATENT OFFICE
CERTIFICATE OF CORRECTION

Patent No. 3,136,903 June 9, 1964

Marvin Trott

It is hereby certified that error appears in the above numbered patent requiring correction and that the said Letters Patent should read as corrected below.

Column 7, lines 39 and 40, after "analogous" strike out -- problems are involved to those above-discussed, and in other analogous --.

Signed and sealed this 3rd day of November 1964.

(SEAL)
Attest:

ERNEST W. SWIDER
Attesting Officer

EDWARD J. BRENNER
Commissioner of Patents